Sept. 18, 1934.  F. V. COOKE  1,973,702
SLIP JOINT
Filed March 31, 1933  2 Sheets-Sheet 1
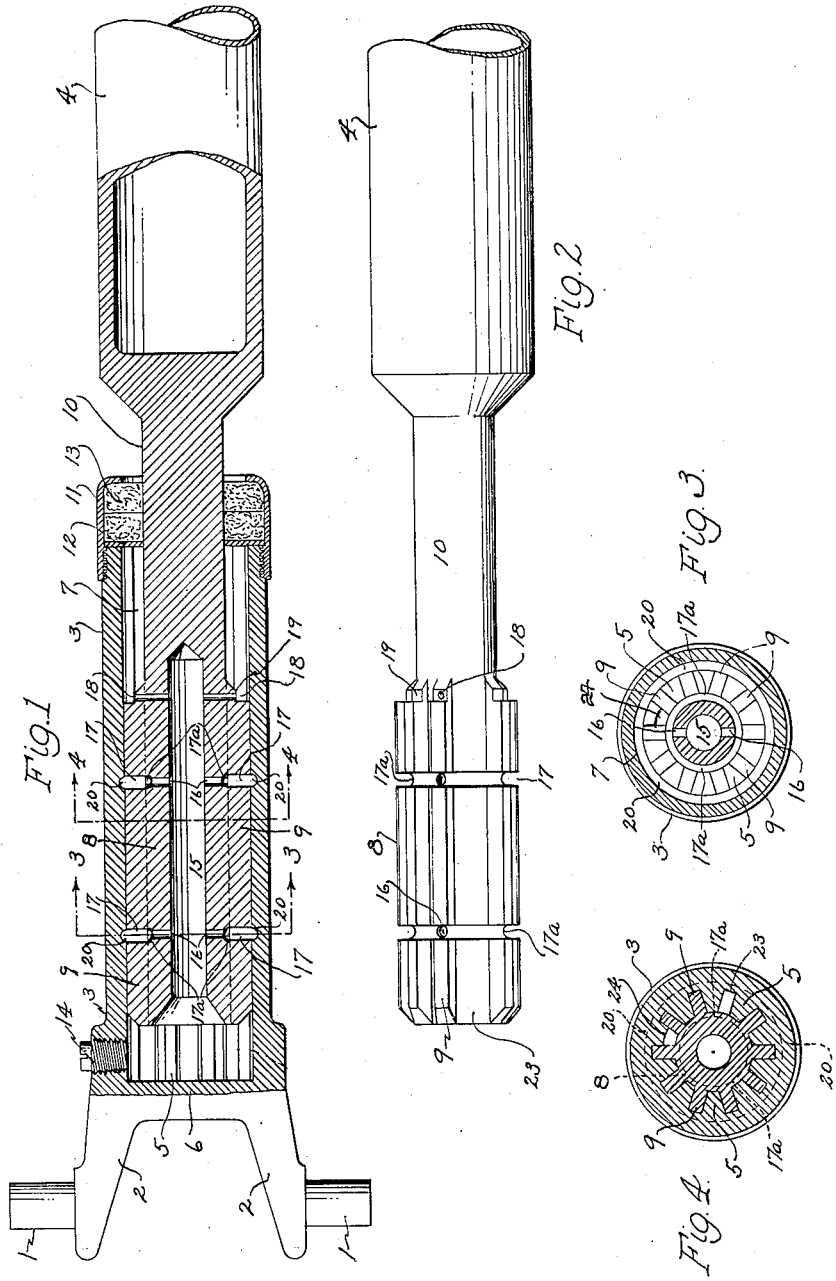
INVENTOR
FRANK V. COOKE
BY
ATTORNEYS Sept. 18, 1934.  F. V. COOKE  1,973,702
SLIP JOINT
Filed March 31, 1933  2 Sheets-Sheet 2
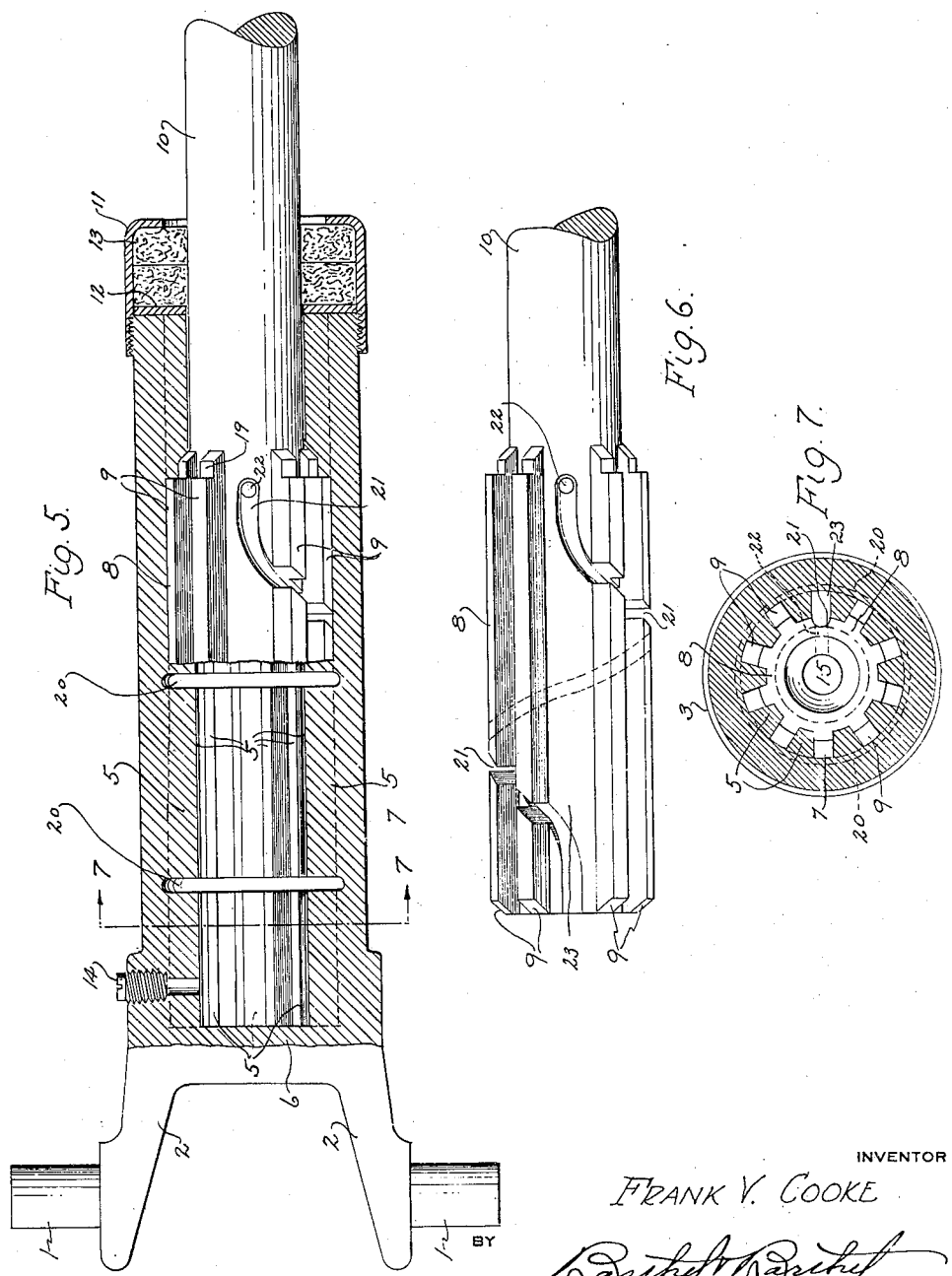
INVENTOR
FRANK V. COOKE
BY
ATTORNEYS Patented Sept. 18, 1934

1,973,702

UNITED STATES PATENT OFFICE 1,973,702

SLIP JOINT

Frank V. Cooke, Detroit, Mich.

Application March 31, 1933, Serial No. 663,749

11 Claims. (Cl. 64—89)

This invention relates to a slip joint for any purpose, and more particularly to the construction of a slip joint connection between a propeller shaft and the hub of a universal joint structure in a motor vehicle construction, whereby such interconnection between shaft and hub, while affording rigid shaft support, permits free relative longitudinal movement therebetween, the most common kind of slip joint being a splined connection.

A problem in connection with slip joint structures, particularly those of the present class and for the purpose as above set forth, is one of lubrication, and an object of the present invention is to provide adequate and continued lubrication of the interengaging surfaces to prevent friction with its consequent disintegration of the parts and resistance to free relative longitudinal movement thereof. A further object is to provide a device, the construction of which is such as to give to its interengaged parts, a maximum of strength and freedom of relative longitudinal movement, with a minimum of lateral play, and to provide for confining the lubricant and at the same time permitting free flow thereof, so that free relative movement of the parts will not be blocked by the confined fluid. It is also an object to provide a simple construction which may be manufactured at a reasonable cost and which is such as to adequately protect the interior parts thereof from dust, dirt or other extraneous matter, and to provide certain other new and useful features in the construction, arrangement and combination of parts, all as hereinafter more fully set forth and particularly pointed out in the appended claims, reference being had to the accompanying drawings, in which Figure 1 is a central longitudinal section through a splined slip joint comprising the hub portion of a universal joint structure and the forward splined end portion of a propeller shaft;

Fig. 2 is a side elevation of the forward splined end portion of the propeller shaft detached from said hub;

Fig. 3 is a transverse section substantially upon the line 3—3 of Fig. 1;

Fig. 4, a similar cross section substantially upon the line 4—4 of Fig. 1;

Fig. 5 is a longitudinal section through said hub and showing a modified construction of splined end portion of the propeller shaft in place within said hub, said end portion being broken away intermediate its ends to more clearly show the interior construction of said hub;

Fig. 6 is a side elevation of the splined end portion of said shaft removed from said hub, and Fig. 7 is a transverse section substantially upon the line 7—7 of Fig. 5.

While I have illustrated in the accompanying drawings, a structure particularly adapted for use as a slip joint connection between a universal joint structure and a propeller shaft in a motor vehicle construction, it will be understood that the present invention is applicable to any splined or other slip joint connection between a stub shaft and a shell or hollow member to receive said shaft, the present invention relating more particularly to the automatic lubrication of any such device where the end portion of a shaft provided with longitudinal ribs or splines, is adapted to slide within a hub or shell having corresponding broached grooves to receive said ribs, or any other form of slip joint where there is friction between contacting surfaces and where said hub or shell is sealed to provide an oil tight compartment within which said shaft end reciprocates, providing a tight chamber to inclose said shaft end and exclude all dust and dirt from the interengaging parts.

As shown in Figs. 1 to 4 inclusive, 1 indicates the bearing stubs of a universal joint structure of the usual form, said stubs being formed integral with the ends of the usual yoke arms 2 which are in turn formed integral with the forward end of an elongated hub portion 3 of the universal joint structure which hub is formed tubular or hollow to receive the forward end portion of a propeller shaft 4 and which end portion is arranged to slide longitudinally in the usual manner, within said hub, said shaft portion having a particular arrangement of spline or rib connection with said hub or shell, as will presently be described, to positively connect said hub and shaft against relative rotary movement and permit free relative longitudinal sliding movement thereof.

The hub or shell 3 is provided with interior longitudinal ribs 5 extending substantially throughout the length of the bore of the shell, which bore is closed at its forward end in any suitable manner as by the integral end wall 6 or otherwise, said bore thus forming a closed chamber 7 within which the forward end portion of the shaft 4 is adapted to reciprocate, said forward end portion or head indicated as a whole by the numeral 8 being formed with a plurality of radially extending integral ribs 9 adapted to fit closely between the ribs 5 on the shell and thus serve as splines to connect the shaft and shell or hub.

As clearly shown in Fig. 4, the ribs 9 are preferably formed with parallel side surfaces to engage the side surfaces of the ribs 5 on the shell and the outer end surfaces of the ribs 9 are preferably arranged to seat or engage, with very limited play, the bottoms of the grooves between the ribs 5 on the shell, there being just sufficient space between the inner end surfaces of the ribs 5 and the bottoms of the grooves between the ribs 9 to permit free longitudinal movement of the shaft head within the shell. The shaft head 8 is bored axially longitudinally thereof inwardly from its forward end to a point adjacent the rear ends of the ribs 9, the portion 10 of the shaft which connects the head 8 with the main body 4 of the shaft, being reduced in diameter; and to close tightly the rear end of the chamber 7 of the shell, a cap or sleeve member 11 is applied to the rear end of the shell by screwthreading the shell externally and internally screwthreading this cap. Seated against the end of the shell within the cap is a plate or washer 12 and interposed between this washer and the inwardly extending end flange of the cap, is a suitable packing 13, this packing being compressed and forced firmly against the reduced portion 10 of the shaft by turning up of the cap upon the end of the shell. The interior chamber 7 or bore of the shell or hub 3 is thus tightly closed at both ends against the escape of lubricant from this chamber, which lubricant may be placed in the chamber through a fill opening at the forward end of the chamber, which fill opening is closed by a removable plug 14.

The interengaged ribs or splines 9 on the shaft head and inwardly extending ribs 5 on the shell are thus inclosed within a tight chamber so that all dust or dirt or other extraneous matter is obviously excluded from the chamber of the shell and from these interengaged parts to eliminate friction and wear which would otherwise be caused by such dust or dirt getting into the chamber.

In order to prevent friction and wear, it is very essential that the lubricant contained within the chamber 7, be forced into contact with the contacting surfaces of the shaft ribs with the contact surfaces of the ribs on the shell, and also with the end surfaces of the shaft ribs where they bottom within the bottoms of the grooves between the ribs on the shell. In order to insure such efficient lubrication, the shaft is bored longitudinally inward from its forward end as at 15 and leading radially outward from this bore are small openings 16 which connect the bore 15 with the bottoms of one or more grooves 17 cut in the head 8 transversely of the ribs 9 and to a depth slightly below the inner end surfaces of the ribs 5 on the shell. When the shaft head is within the shell 3 with its ribs engaged within the grooves between the ribs 5 on the shell, said ribs 5 will extend across the annular grooves 17, but as these grooves 17 are of greater depth than the depth of the teeth or ribs 5, each groove 17 will provide an annular channel 17a around the head which channel is in open communication with the central bore 15 and thus the oil entering this center bore under pressure upon longitudinal reciprocation of the shaft head will have a plurality of paths of escape radially outward from the bore 15 and into the annular channels 17a formed by the grooves 17. The lubricant is thus evenly distributed to the contacting surfaces of the ribs on the shaft and shell to effectually lubricate the same, and as the annular grooves 17 are cut transversely of the ribs 9, and these ribs are thus cut away where said groove or grooves cut across them, pockets are formed within these annular grooves to receive and distribute lubricant.

As the chamber 7 within which the shaft head 8 reciprocates, is a closed chamber, upon reciprocation of this head, heavy or severe compression will be created at the ends of the chamber by such reciprocation unless the lubricant contained in the chamber be permitted a comparatively free flow in order to relieve this compression. In the present construction this is accomplished by means of the grooves 17 which provide the pockets or spaces where they cut across said ribs, to receive the lubricant upon its compression by longitudinal movement of the head, and the severe shocks and strains which are usually present in the operation of slip joints of this character as commonly constructed, are diminished, and freedom of flow from one end of the chamber 7 to the other may be further increased if found desirable, by providing one or more small holes or bores 18 in the shaft at the rear end of the head 8, these small holes being preferably bored diametrically through the shaft and through the rear end portions of two of the ribs 9, which rear end portions of all of these ribs are preferably reduced in external diameter as at 19. By boring the holes 18 through two of the ribs 9 instead of through the reduced portion 10 of the shaft beyond the ribs or through the shaft between said ribs, the strength of the shaft is not lessened by such bores, and further, these bores are preferably small in diameter so that the flow of lubricant therethrough will be restricted and a sufficient compression of the lubricant within the bore 15 will be secured to force the lubricant radially outward into the channels 17a, and pockets opening thereinto, to insure perfect lubrication of the contacting surfaces of the interengaging ribs.

To further insure adequate lubrication at all times of the interengaging surfaces of the ribs on the shaft head and on the shell or hub 3, this shell may also be formed with one or more annular interior grooves 20 as clearly shown in Fig. 5, or these grooves may be formed spiral if desired, they cutting transversely across the several ribs 5 which project inwardly from the wall of the shell, and thus these grooves 20 also form, by being cut to a depth slightly greater than the depth of the grooves between the ribs 5, annular channels in the shell, which channels surround the head of the shaft and across which the ribs of the shaft head reciprocate so that lubricant carried by the annular grooves 17 in the shaft head may escape into the annular grooves 20 as these grooves pass each other, thus maintaining a quantity of lubricant within the annular channels 20 and pockets formed where said grooves cut through said ribs on the shell, to supply lubricant at all times to the contacting surfaces, this supply of lubricant within these channels and pockets being maintained under a certain amount of pressure, not only by the reciprocation of the shaft head, but also by centrifugal force, which greatly assists in lubricating the close fitting outer end surfaces of the ribs on the head against the bottoms of the shell grooves.

A slightly modified construction is shown in Figs. 5 to 7 inclusive, this modification consisting in a modification of the form of the grooves 17 as shown in Fig. 2, one or more spirally formed grooves 21 being substituted for the annular groove or grooves 17. This groove 21 as shown, is formed in the head 8, cutting across the several ribs 9 thereof along a spiral path extending around the head, one end of this spiral groove or channel opening through the forward end of the head and its opposite end terminating in a small hole or bore 22 opening into the bore 15 of the head.

A restricted flow of lubricant from end to end of the chamber 7 past the head 8 and which will prevent hammering caused by reciprocation of the head against the oil confined in said chamber, may if found desirable, be provided by partially or wholly omitting one or more of the ribs 9 as indicated at 23, thus providing one or more oil passages the length of the head; or by partially or wholly omitting one or more of the ribs 5 of the shell as indicated at 24. The longitudinal passage or passages thus provided by the omission of such rib or ribs, also provides means for conducting oil to the grooves 17, 20 or 21.

Having thus fully described my invention what I claim is:

1. A slip joint comprising a hollow outer member closed at one end and having internal longitudinally extending grooves, a shaft extending into said outer member through the open end thereof and slidable longitudinally therein and provided with external longitudinally extending ribs to engage within said grooves of said outer member, said shaft being also provided with an external groove intersecting said ribs and with an axial passage opening through the inner end of said shaft and communicating with said groove whereby upon movement of said shaft within said outer member toward the closed end thereof, lubricant will be forced through said passage into said external groove to lubricate the outer surfaces of said ribs in contact with the bottoms of said grooves in said outer member, and means for closing the open end of said outer member around said shaft.

2. A slip joint comprising a tubular outer member closed at one end and having internal longitudinally extending grooves, a shaft extending into said outer member through the open end thereof and slidable longitudinally therein and having a portion provided with external longitudinally extending ribs to engage within said grooves of said outer member, said shaft being also provided with an external groove extending transversely of and dividing said ribs, said shaft being also formed with an axial bore extending inwardly from the inner end of said shaft and an opening providing communication between said bore and said external groove, whereby, upon movement of said shaft longitudinally within said outer member toward the closed end thereof, lubricant will be forced through said bore and opening into said external groove to lubricate the outer surfaces of said ribs in contact with the bottoms of said grooves in said outer member, and means for closing the open end of said outer member around said shaft.

3. A slip joint comprising a tubular outer member closed at one end and having internal longitudinally extending grooves, a shaft having a head portion extending into and slidable longitudinally within said tubular outer member and provided with external longitudinally extending ribs to engage and bottom within said grooves of said outer member and formed with an external groove dividing the outer surfaces of said ribs transversely and formed with an axial bore opening through the free end of said head and with a radial hole opening into said bore and into the bottom of said external groove, and means for closing the open end of said outer member around said shaft.

4. A slip joint comprising a tubular outer member closed at one end and having internal longitudinally extending grooves, a shaft having a head portion provided with external longitudinally extending ribs to engage within said grooves of said outer member, said head being formed with a groove severing said ribs transversely and cutting below the bases of said ribs to form a continuous channel around said head, said head being also formed with a passage communicating with said channel and opening through the end of said shaft, and means for closing the open end of said outer member around said shaft.

5. A slip joint comprising a hollow outer member closed at one end and having internal longitudinally extending grooves and an internal groove cutting below the bottoms of said grooves to form a continuous groove extending transversely of said longitudinal grooves, and a shaft having a head portion formed with longitudinal ribs to engage and slide longitudinally within said grooves of said outer member, said head of said shaft being formed with an external groove dividing said ribs of said head and cutting below the bases of said ribs to form a continuous channel extending around said head, said head being also formed with a passage opening through the end of the head and communicating with said external groove and continuous channel of said head, and means for closing the open end of said outer member around said shaft.

6. A slip joint comprising a tubular outer member closed at one end and having internal longitudinally extending ribs and grooves, a shaft having a head portion provided with external longitudinally extending ribs to engage within said grooves of said outer member, said head being formed with an external groove extending transversely of said ribs of said head and intersecting said ribs to form a plurality of pockets, said external groove being of a greater depth than the depth of said ribs of said outer member, to form a continuous channel around said head inwardly of the inner edge faces of said ribs on said outer member with said pockets opening into said channel, said head being also formed with a passage opening at one end into said channel and at its opposite end through the end of said head, and means for closing the open end of said outer member around said shaft.

7. A slip joint comprising a tubular outer member closed at one end and having internal longitudinally extending grooves, a shaft having a head portion provided with external longitudinally extending ribs to engage within said grooves of said outer member, said head being formed with an external groove extending spirally around said head from end to end thereof and opening therethrough at one end and severing said ribs of the head at its points of crossing the same, said head being also formed with a passage opening at one end into one end of said spiral groove and at its opposite end through the end of said shaft, and means for closing the open end of said outer member around said shaft.

8. A slip joint comprising a tubular outer member closed at one end and having internal longitudinally extending ribs and grooves and provided with a groove extending transversely of said longitudinal grooves, said groove being of greater depth than the depth of said longitudinal grooves to provide an annular channel outwardly of the bottoms of said longitudinal grooves, a shaft having a head portion formed with external longitudinal ribs to engage within said longitudinal grooves of said outer member and slide therein across said transverse groove, said head being also formed with an external groove cutting across and severing said longitudinal ribs and extending around said head, said external groove in said head being of a greater depth than the depth of said ribs on said outer member to form a continuous channel around said head at the bottoms of the spaces between said ribs on said head, said head being also formed with a passage opening at one end into the bottom of said channel of said head and at its opposite end opening through the end of said head, and means for closing the open end of said outer member around said shaft.

9. A slip joint comprising a hollow outer member closed at one end and having internal longitudinally extending grooves, an inner member having external longitudinally extending ribs to engage within said grooves of said outer member and move longitudinally therein, one of said members being provided with a groove extending therearound and transversely of said ribs and grooves of said members and forming a continuous channel in communication with said grooves and spaces between said ribs, and means for closing the open end of said outer member.

10. A slip joint comprising a hollow outer member closed at one end and open at its opposite end and having internal longitudinally extending grooves, a shaft member extending into said outer member through the open end thereof and having longitudinally extending ribs to engage and bottom within said grooves and move longitudinally therein, one of said members having a groove extending therearound transversely of said ribs and grooves and communicating with the space within said outer member at the inner end of said shaft member, and means for closing the open end of said outer member around said shaft member.

11. A slip joint comprising a hollow outer member closed at one end and open at its opposite end and having internal longitudinally extending grooves, a shaft extending into said outer member through the open end thereof and having a head formed with longitudinally extending ribs to engage within said grooves, said outer member forming a lubricant chamber at each end of said head within said member, said head being formed with an external groove extending therearound transversely of said ribs and open into all of the spaces therebetween and communicating through said spaces with said chambers, and means for closing the open end of said outer member around said shaft.

FRANK V. COOKE.